Feb. 6, 1962 C. J. CORNELL 3,019,823
AUTOMATIC WOOD FEEDING AND CUTTING SAW APPARATUS
Filed June 18, 1959 8 Sheets-Sheet 4

INVENTOR.
CYRUS J. CORNELL
BY D. Emmett Thompson
Attorney

Feb. 6, 1962   C. J. CORNELL   3,019,823
AUTOMATIC WOOD FEEDING AND CUTTING SAW APPARATUS
Filed June 18, 1959   8 Sheets-Sheet 5

Fig. 8
Fig. 9

INVENTOR.
CYRUS J. CORNELL
BY D. Emmett Thompson
Attorney

United States Patent Office 3,019,823
Patented Feb. 6, 1962

3,019,823
AUTOMATIC WOOD FEEDING AND CUTTING
SAW APPARATUS
Cyrus J. Cornell, Laceyville, Pa.
Filed June 18, 1959, Ser. No. 821,186
1 Claim. (Cl. 143—47)

This invention relates to and has as an object a new and improved saw for cutting wood into variable lengths.

More particularly, this invention has as an object a new and improved saw which functions to automatically feed the wood to be cut to and past the saw to halt the feeding movement of the wood, cut the wood and return the saw to its original position and thereafter restore the feeding of the wood to and past the saw.

A further object of this invention is the provision of a new and improved wood clamping mechanism which functions to clamp the wood against the saw table during the wood sawing operation.

Another object of this invention is the provision of means for reversing the cutting movement of the saw should the saw become jammed, or the speed thereof fall below a predetermined level.

The saw of this invention has particular use in connection with the cutting of slabs of wood cut from logs into fire or cord wood lengths. Briefly described, the apparatus forming this invention operates as follows: A wood trough having a continuously moving conveyor receives the wood slabs and feeds the slabs to and past the cutting saw until the wood engages a stop gate which is adjustably positioned relative to the saw to determine the length of the cut of the wood. After engaging the gate, the apparatus functions to halt movement of the feed conveyor and to initiate movement of a reciprocating saw carriage on which the continuously rotating saw blade is mounted. As the saw carriage moves forwardly the saw cuts the wood which is held against the wood table by an automatic hold-down mechanism moved to the holding position as a result of the wood striking the stop gate. After the cut has been completed the saw carriage movement is reversed to return the saw to its normal position and the hold-down mechanism is returned to its upper inoperative position. Simultaneously therewith a secondary wood supporting arm swings outwardly out of the path of movement of the cut wood to allow the wood to drop on to a discharge conveyor, or the like. When the saw has returned to its rearward most position and the hold-down mechanism is in its uppermost position, and the wood supporting arm has returned to a wood supporting position, the feed conveyor movement is restored to feed the wood forwardly to the gate and the next cut.

The invention consists in the novel features and in the combinations and constructions hereinafter set forth and claimed.

In describing this invention, reference is had to the accompanying drawings in which like characters designate corresponding parts in all the views.

Referring now to FIGURES 1, 2, 3 and 5, the frame for supporting the saw apparatus is made up of a pair of lower channel members 20 and 22 extending cross-wise and serving as lower supporting or foot members. The channel members 20 and 22 are connected together by a plurality, shown in this illustration to be 4, transversely extending channel members 24, 26, 28 and 30. The rearward ends of the channel members 20 and 22 have a pair of upwardly extending channel members 32 and 34 affixed thereto. A pair of similar upstanding channel members 36 and 38 are affixed to the transverse channel members 20 and 22 intermediate their ends. The upper ends of the members 32 and 36, 34 and 38 are affixed to channel members 40 and 42 extending rearwardly in a parallel direction to the members 20 and 22, and the rear ends of the members 40 and 42 are braced on the upper ends of the members 32 and 34 by a pair of angle members 44 and 46, 48 and 50 in order to support the main drive motor 52 which is anchored to the upper surfaces of the members 40 and 42 by bolts 54 at the rearward or outer ends of the members 40 and 42.

Figure 2:
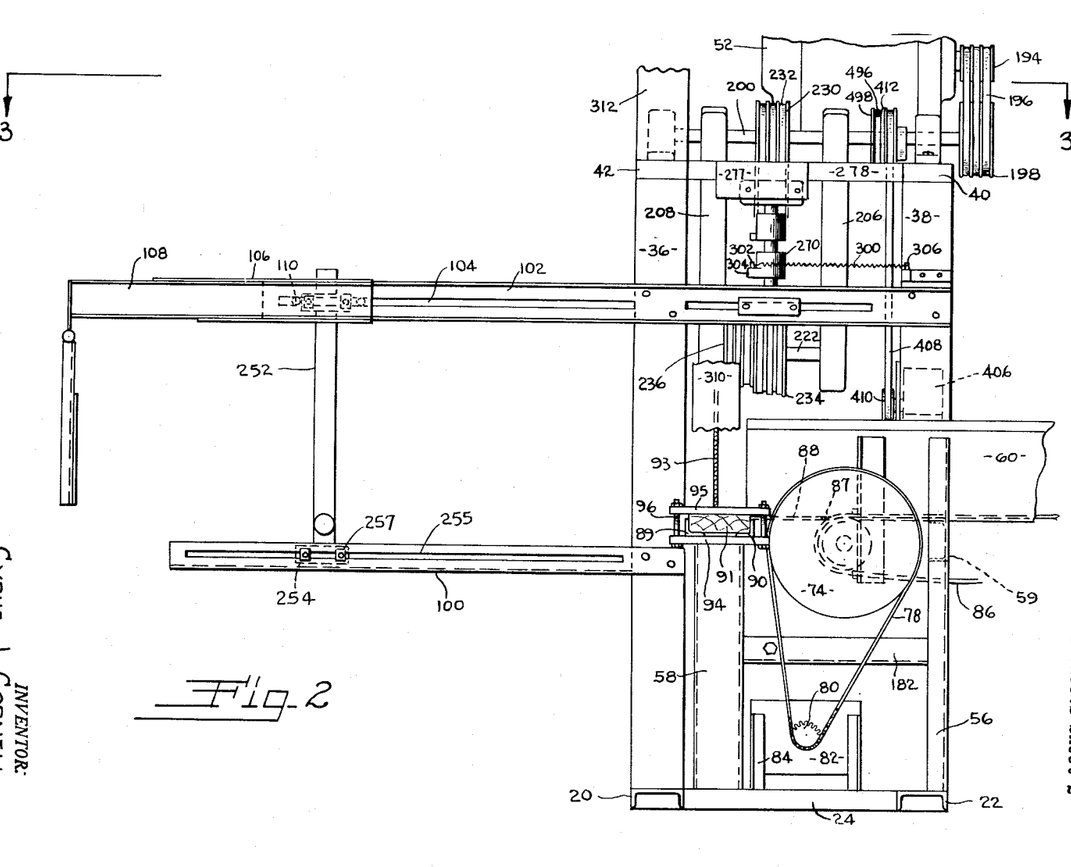
FIGURE 2 is a view taken looking in the direction of the arrows 2—2 of FIGURE 1, with parts omitted for purposes of clarity.

As best seen in FIGURE 2, an upstanding channel member 56 is affixed to the front end of the lower supporting member 22 adjacent the transverse member 24. A second upstanding channel member 58 is affixed to the member 24 intermediate the ends thereof. A cross member 59 is affixed between the upstanding members 38 and 56 and the member 59 is affixed by any suitable means to and supports the underside of the forward end of a conveyor feed trough. The feed through comprises an outer upstanding side member 60, a flat bed portion 61 which is affixed to the member 59 and a second inner side member 62.

Adjacent the forward end of the conveyor a feed roller 64 is journaled in a pair of split bearings 66 and 67 and the bearings are mounted on a pair of depending angle irons 68 and 70 affixed to the side members 62 and 60, respectively, of the feed trough.

The feed roller 64 includes an outwardly extending stub shaft 72 to which a sprocket 74 is affixed. The sprocket 74 is connected by an endless chain 78 to the drive sprocket 80 of a hydraulic motor 82 mounted on the upper ends of a plurality of supporting members 84 carried by the transverse members 24 and 26. The connection between the motor 82 and the roller 64 serves to rotate or move an endless conveyor belt 86 over the feed roller 64 and a rearwardly positioned idler roller, not shown, in order to feed the wood to be cut forwardly toward the saw.

Adjacent the forward end of the feed trough, the conveyor belt 86 passes through a slot 87 formed in the bed 61 and over the drive roller 64. The slot 87 is positioned a sufficient distance rearwardly of the forward edge of the feed trough bed 61 whereby to form a wood supporting shelf 88 between the side members 60 and 62.

Referring now to FIGURE 2, it will be seen that a pair of crosswise extending angle irons 89 and 90 are affixed adjacent the outer ends to the upper edge of the channel member 58 and are suitably affixed to the framework at their inner ends. Mounted between the angle members 89 and 90 is a saw table 91 formed with a saw kerf 92 (FIGURE 3) extending outwardly from the inner end of the table to receive the saw 93. The table 91 is clamped to the members 89 and 90 at its outer end by a clamping arrangement comprising a pair of bars 94 and 95 clamped together by bolts, or the like, 96 whereby table 91 is fixed against movement.

A pair of outwardly extending members 100 and 102 are mounted on the frame by any suitable means such as bolts, or the like, the member 100 being affixed to the upstanding member 36 and the member 102 being affixed to the upstanding member 36, as well as the upstanding member 38.

The outer end of the member 102 is formed with a longitudinally extending slot 104 and the upper edge of member 103 is provided at its upper end with an overhanging plate 106. The slot 104 and plate 106 serve as guides to receive an adjustable member 108 affixed to the member 102 by a pair of bolts, or the like, 110 extending through the member 108 and through the slot 104.

Figure 4:
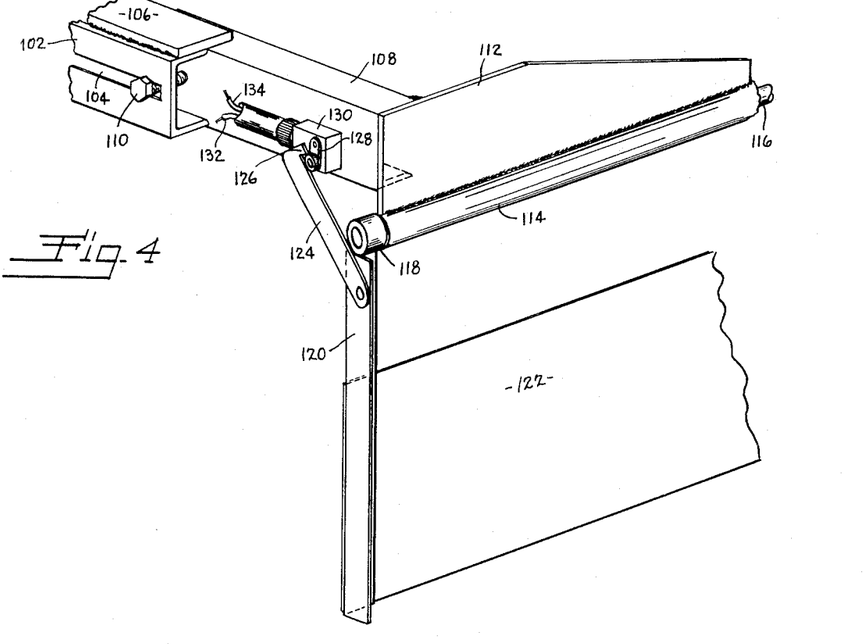
FIGURE 4 is a fragmentary perspective view of a portion of the invention.

Referring now to FIGURE 4, the outer end of the member 108 has a plate 112 affixed thereto and the lower end of the plate 112 is formed with a cylindrical bearing sleeve 114. A rod 116 is received within the bearing 114 and the ends of the rod, extending beyond the bearing sleeve 114 are formed with enlarged heads 118, one of which is shown in FIGURE 4. A depending angle iron 120 is affixed to each of the heads 118 and a wood stop gate comprising a plate 122 is carried on the lower ends of the members 120 between the two members 120. As will be obvious from the construction just described, the plate 122 is mounted for rotation on the rod 116 in the bearing 114. The upper end of the inner member 120 has an arm 124 affixed thereto. The outer end of the arm 124 is formed with a hook 126 which serves to engage the actuator 128 of a switch 130 connected in the electrical operating circuit of the machine by leads 132 and 134. When wood is fed by the conveyor belt 86 forwardly into engagement with the gate 122 the gate is raised or pivoted about the bearing 114 in a counterclockwise manner, as seen in FIGURE 4, so that the arm 124 serves to actuate the switch 130 to halt advancement of the belt 86 for a purpose to be hereinafter described.

The saw 93 is reciprocated forwardly and rearwardly through the kerf 92 in the saw table 91 to effect the cutting of the wood after the wood has been fed forwardly by the belt 86 over the table 91 and into engagement with the gate 122 by mechanism to be next described.

Figure 1:
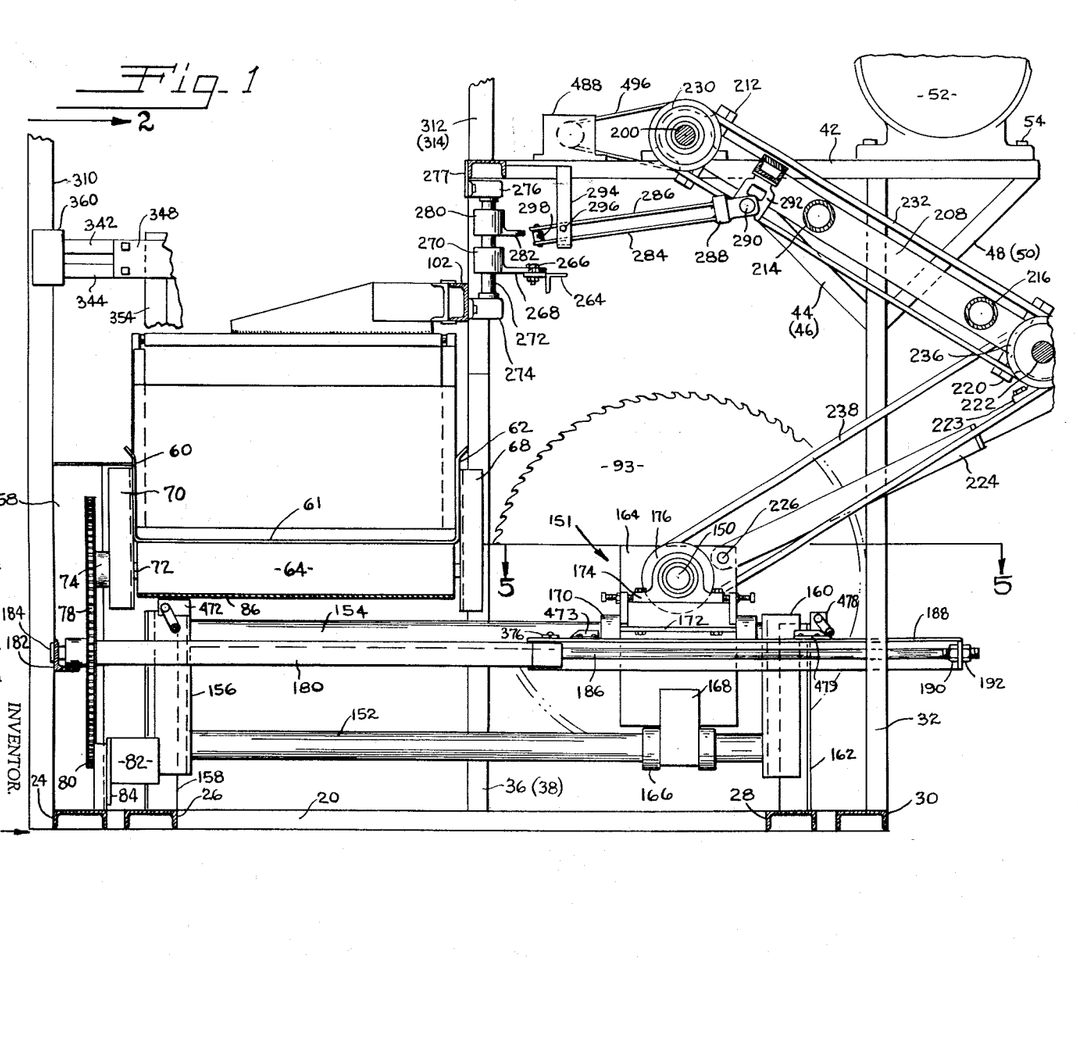
FIGURE 1 is a side elevational view taken approximately on line 1—1 of FIGURE 3 of the apparatus forming the embodiment of this invention with parts omitted for purposes of clarity.
Figure 5:
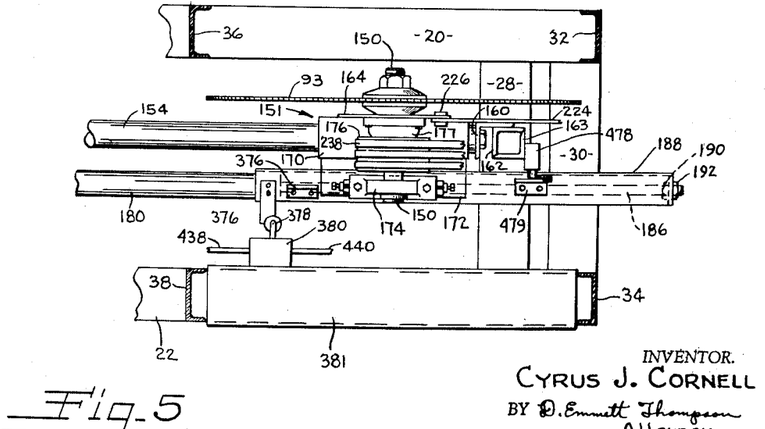
FIGURE 5 is a fragmentary plan view of a portion of the invention taken on line 5—5 of FIGURE 1.

Referring to FIGURES 1 and 5 the saw 93 is supported and rotated on a shaft 150 and the shaft 150 is rotatably supported in a saw carriage, generally indicated at 151, which is reciprocated forwardly and rearwardly on a pair of rails 152, 154 supported at their outer ends by the angle plate 156 affixed to an upstanding angle plate 158 mounted on the transverse channel member 26. The rear ends of the rails 152 and 154 are affixed to an angle plate 160 which is in turn affixed to a pair of upstanding angle irons 162, 163 welded together to form a box and supported at their lower ends on the channel member 28. The saw carriage 151 comprises a plate 164 having a sleeve 166 affixed by means of an arm 168 to the lower end thereof and the sleeve 166 is slidably mounted on and receives the rail 152. A second sleeve 170 is affixed to the plate 164 intermediate the ends thereof and the sleeve 170 receives the rail 154. An outwardly extending plate 172 is affixed to the outer side of the sleeve 170 and a split bearing 174 is mounted on the plate 172 to receive the outer end of the shaft 150. A multi-sheave pulley 176 is affixed to the shaft 150 intermediate the bearing 174 and the plate 164 and the shaft 150 is journaled in a bearing 177 mounted on the plate 164. The shaft 150 extends through the bearing 177 and plate 164 and the saw 93 is affixed to the outer end of the shaft 150 by any suitable means, such as a clamp washer and nut, or the like. As will be obvious when the carriage 151 is reciprocated forwardly and rearwardly on the rails 152 and 154 by means of the sleeves 166 and 170, the saw 93 will be moved forwardly and rearwardly to effect the wood cut.

Movement of the saw carriage is effected by means of a hydraulic cylinder 180 mounted between the rearward members 32 and 34 and forward members 56 and 58 of the main frame in the following manner. The rearward end of the cylinder 180 is affixed to an angle member 182 mounted between the members 56 and 58 by means of a bolt 184 whereby the cylinder 180 is fixed against movement. The piston rod 186 of the cylinder 180 has an L-shaped member 188 affixed to the outer end of the rod 186 by means of a pair of nuts 190 and 192 whereby movement of the rod 186 will move the member 188. The upper side of the angle member 188 extends in a direction parallel to the rod 186 and is spaced therefrom and is fixed by any suitable means to the underside of plate 172 whereby introduction of hydraulic fluid into the forward end of the cylinder 180 will cause the saw to move from the position shown in FIGURES 1 and 5 to the left to effect a cut of wood positioned on the table 91 and movement of the saw to the right into the rearwardmost position, shown in FIGURES 1 and 5, is effected by the introduction of hydraulic fluid into the rearward or outer end of the cylinder 180 adjacent the cross member 182. In this manner, it will be obvious that by controlling the introduction of hydraulic fluid into the forward and rearward ends of the cylinder 180 reciprocating movement of the saw carriage 151 can be controlled.

The saw 93 is constantly rotated by the motor 52 through connections to be now described. The output shaft of the motor 52 is provided with a multi-sheave pulley 194, see FIGURE 2. The pulley 194 is connected by a plurality of endless belts 196 to a pulley 198 having a number of pulley sheaves corresponding to pulley 194. The pulley 198 is affixed to the outer end of a cross shaft 200 journaled in a pair of split bearings 202 and 204 mounted on the upper sides of the frame members 40 and 42, see FIGURE 3.

A pair of arms 206 and 208 are pivotally connected by split bearings 210 and 212 to the shaft 200 whereby the shaft is free to rotate within the bearings 210 and 212. Referring to FIGURE 1, the arms 208 and 206 are affixed together by a pair of transverse cylindrical members 214, 216. The lower ends of the arms 208 and 206 are provided with a pair of split bearings 220, one of which is shown in FIGURE 1, and a shaft 222 is carried by bearings 220. A similar split bearing, a portion of which is shown at 223, is provided on the outer end of an arm 224 whereby to pivotally connect the arm 224 to the shaft 222. The forward lower end of the arm 224 is pivotally connected to the rearward top end of the plate 164 by means of a pin 226, or the like. By the connections, just described, it will be seen that the arms 206 and 208 and arm 224 pivot about the shafts 200, 222 and the connection 226, respectively, whereby the arms move with the saw carriage 151.

Referring now to FIGURE 2, a second multi-sheave pulley 230 is affixed to the shaft 200 intermediate the arms 206 and 208 whereby the pulley 230 will rotate with the shaft 200. Pulley 230 is connected by a plurality of endless belts 232 to a corresponding multi-sheave pulley 234 affixed to the shaft 222 for rotation therewith. Adjacent the pulley 234 on shaft 222 is a second multi-sheave pulley 236 affixed to the shaft 222 for rotation therewith. The pulley 236 is connected by a plurality of endless belts 238 to the corresponding multi-sheave pulley 176 carried by the shaft 150 on the saw carriage, all whereby the saw is continuously rotated by the motor 52 regardless of the position of the saw carriage on the rails 152 and 154.

Figure 3:
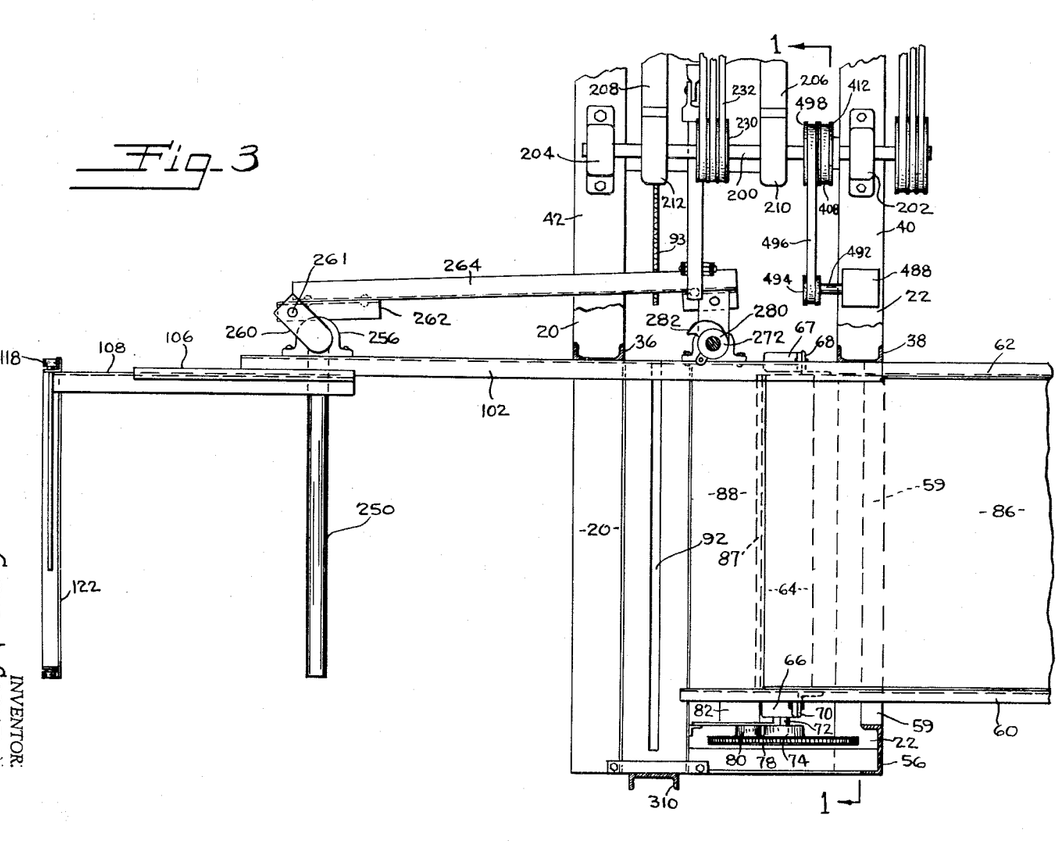
FIGURE 3 is a top plan view taken looking in the direction of the arrows of line 3—3 on FIGURE 2 with parts omitted for purposes of clarity.

Referring now to FIGURE 3, a wood supporting arm 250 is mounted to swing into the path of movement of the wood travel forwardly of the wood stop gate 122 to support the outer end of the wood between the wood table 91 and the gate 122 during the cut. The arm 250 is affixed at its inner end to an upstanding shaft 252 journaled for rotation in a pair of bearings 254 and 256. The bearing 254 is supported in a slot 255 formed in the outwardly extending member 100 by means of bolts, or the like, and the bearing 256 is similarly supported in the slot 104 in the member 102 whereby the entire mechanism may be moved toward or away from the saw 93 to adjustably support the wood to be cut. The upper end of the shaft 252 has an arm 260 affixed thereto and the outer end of the arm 260 is pivotally connected, as at 261, to a plate 262 which is in turn suitably affixed to an inwardly extending member 264. The inner end of the member 264 is affixed by a nut and bolt 266, or the like, to the ear 268 of a sleeve member 270, see FIGURE 1. The sleeve 270 is affixed to a shaft 272 journaled for rotation in a pair of bearings 274 and 276 mounted respectively on the member 102 and a plate 277 affixed to a transversely extending channel member 278 carried between the forward ends of the frame members 40 and 42. Intermediate the sleeve 270 and the bearing 276 is a second sleeve 280 affixed to the shaft 272 for rotation therewith. The sleeve 280 is formed with an outwardly extending hook portion 282, see FIGURE 3.

Referring again to FIGURE 1, a pair of arms 284 and 286 are affixed at their inner ends to a trunnion 288, carrying a stub shaft 290. The shaft 290 is received in a bearing member 292 carried between the arms 206 and 208 whereby movement of the arms 206 and 208 in a cross-wise direction, as viewed in FIGURE 1, will move the arms 286 and 284 forwardly or to the left. A pair of depending members 294 are supported by the frame member 40 and carry a pin 296 therebetween. The pin 296 is received between the arms 286 and 284 and serves to guide the movement of the arms. A roller 298 is carried between the forward ends of the arms 284 and 286 and serves, when the arms are moved to their forwardmost position, to roll over and engage the hook 282 on the sleeve 280 which is in turn affixed to the shaft 272. As will be obvious, engagement of the hook 282 by the roller 298 will take place when the saw is moving forwardly or to the left, as viewed in FIGURE 1, to effect a cut. Subsequently, upon rearward movement of the saw, or to the right, as viewed in FIGURE 1, the roller 298 will engage the hook 282 and cause the sleeve 280 and shaft to be rotated in a clock-wise direction, as viewed in FIGURE 3. This rotation of the shaft 272 will be transmitted through the sleeve 270, member 264, arm 260, shaft 252 to the wood supporting arm 250, moving it in a clock-wise direction, as viewed in FIGURE 3, to permit the wood cut by the saw 93 to drop off of the arm 250 and wood supporting table 91 below the frame of the machine to be carried away by a discharge conveyor, or the like, not shown. When the saw carriage has moved a sufficient distance rearwardly, the roller 298 will roll off of the hook 282, thus releasing the shaft 272 which will then be urged counter-clockwise, as viewed in FIGURE 3, to return the arm 250 to the position shown in FIGURE 3, by reason of a tension spring 300, see FIGURE 2, affixed to a pin 302 mounted on a second ear 304 formed on the sleeve 270. The opposite end of the spring 300 is affixed to a pin 306 mounted on the upstanding frame member 38. From the connection just described, it will be obvious that normally the wood support arm 250 is in the position shown in FIGURE 3, to support the wood fed past the table 90 and into engagement with the stop gate 122. Arm 250 remains in this position until the saw 96 has completed the cut of the wood and commences the return movement, which movement will cause the arm 250 to be swung outwardly from beneath the wood to thereby permit the wood to fall on to the removal mechanism not shown.

Previous to the wood cutting operation and subsequent to the engagement of the wood with the stop gate 122 and the halting of the feed conveyor belt 86, a wood hold-down, or clamping mechanism, is operated to clamp the wood to be cut to the wood supporting tables 90 and 92 by mechanism to be described in connection with FIGURES 6, 7, 8 and 9. An upstanding extending member 310 is mounted on the outside edge of the transverse frame member 24 adjacent the member 58. A pair of extension members 312 and 314 are mounted on the upper sides of the outer ends of the members 40 and 42 which are supported on the upper ends of the frame members 36 and 38. A cross member 278 connects the outer ends of the members 40 and 42 together. The forward edges of the upper ends of the members 312 and 314 are connected by a transversely extending angle member 316, see FIGURE 6. A pair of cross members 318 and 320 are supported at their outer ends on the outer side edges of the upper end of the member 310 and at their inner ends on the member 316 intermediate the members 312 and 314. A Z-shaped member 322 has its upper leg 324 affixed to the underside of the transverse member 318 by a pair of bolts 326. The lower leg 328 of the Z-shaped member supports and has affixed thereto the lower end of a cylinder 330. The cylinder 330 is provided with a piston rod 332 and the upper end of the rod 332 is threaded and is affixed by means of a nut 334 to a yoke member comprising a cross plate 336 and a pair of downwardly extending arms 338 and 340 positioned between the cross members 318 and 320.

The lower ends of the arms 338 and 340 are suitably affixed to the upper side of a channel member 342 comprising part of the hold-down assembly.

Figures 6, 7:
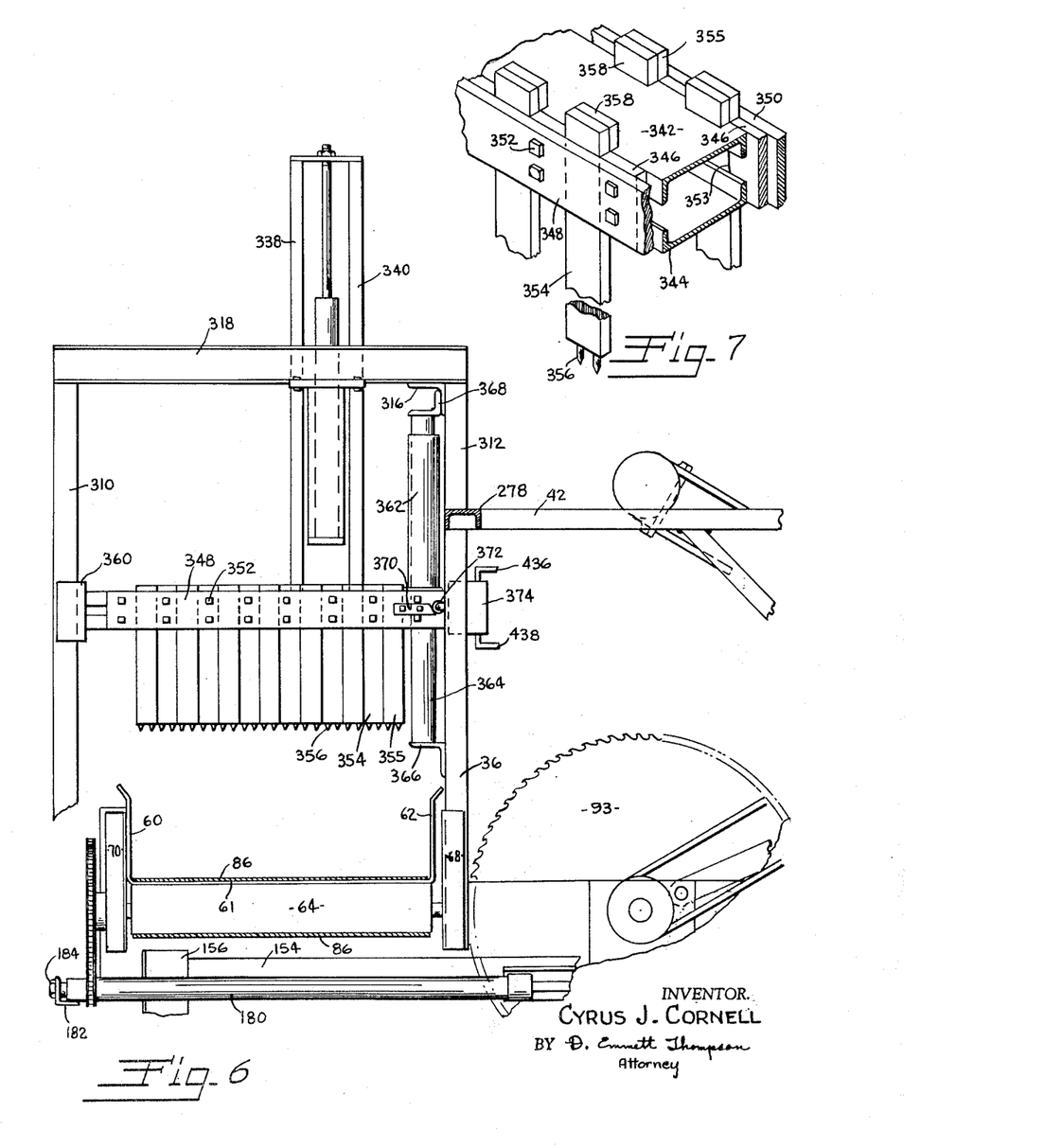
FIGURE 6 is an elevational view of the hold-down mechanism shown in the up position.
FIGURE 7 is a fragmentary perspective view with parts broken away and parts in section of a portion of the hold-down mechanism.

The hold-down assembly is made up of the channel member 342 and a channel member 344 affixed in spaced-apart relation with the channels opening toward each other by a plurality of blocks 346, see FIGURE 7. The blocks 346 are positioned in spaced-apart relation lengthwise of the members 342 and 344 along both edges thereof. Outer plates 348 and 350 are affixed by any suitable means, such as bolts, or the like, 352 to the blocks 346 whereby the space formed between the blocks 346, plate 348 and members 342 and 344 forms a guide channel 353 for a plurality of hold-down members 354 and 355 positioned in staggered or offset relation along the outside edges of the members 342 and 344.

Figure 9:
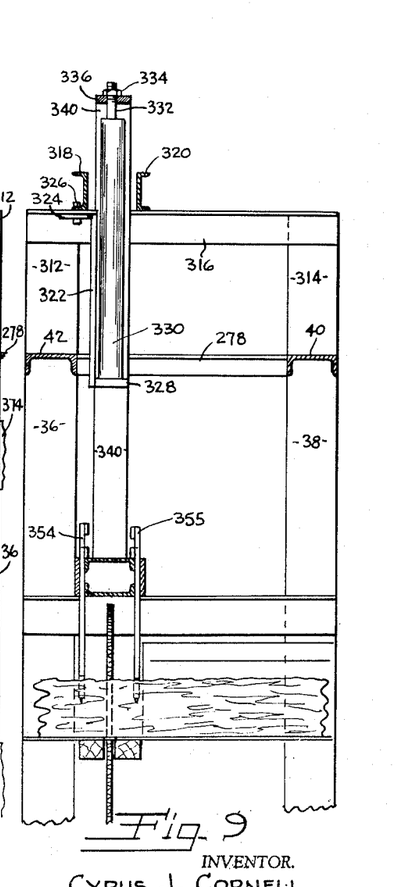
FIGURE 9 is a side elevational view taken looking in the direction of the arrows of line 9—9 of FIGURE 8.

As best seen in FIGURE 9, the hold-down assembly is so positioned with respect to the saw 93 that the members 354 and 355 engage the wood on the opposite sides of the saw.

The hold-down members 354 and 355 are each provided with a pair of wood engaging spikes 356 at their lower end and a stop block 358 at their upper ends, the blocks 358 serving to limit the downward movement of the members 354 and 355 in the guide channels 353. As will be obvious by this construction the members 354 and 355 when the hold-down assembly is moved downwardly into engagement with the wood on the saw table 91 take a profiling position, that is, the members 354 and 355, due to their free sliding movement in the guide channels 353 formed in the hold-down assembly follow the contour of the wood 359 supported on the feed conveyor and wood tables, see FIGURE 8 for example.

The hold-down assembly is guided for up and down movement by the cylinder 330, rod 332, and the depending arms 338 and 340 in the following manner. The left-hand end of the hold-down assembly, as viewed in FIGURE 6, has a channel-shaped member 360 affixed to the outer ends of members 342 and 344 and the member 360 is received on the member 310 for guiding upward and downward movement therealong. The inner end of the upper member 342 is provided with an upstanding sleeve 362. A pair of aligned cylindrical apertures are formed in the upper and lower members 342 and 344. A guide rail 364 supported at its lower end on an angle bracket 366 is carried between the frame members 36 and 38 and supported at its upper end by an angle member 368, affixed to the member 316. The guide rail 364 is received in the apertures formed in the members 342 and 344 and the sleeve 362 whereby to guide the upward and downward movement of the hold-down assembly.

Figure 8:
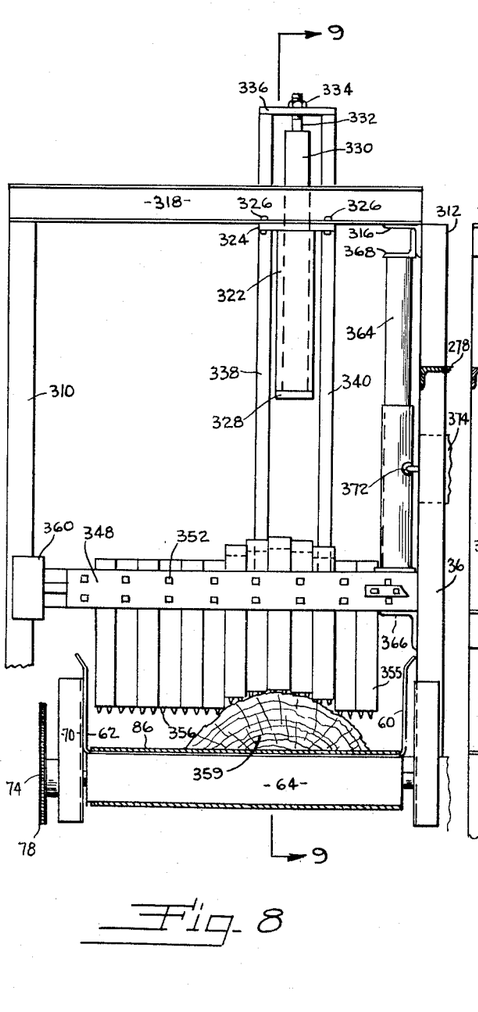
FIGURE 8 is an elevational view similar to FIGURE 6 of the hold-down mechanism shown in the down position.

As will be obvious, when pressure is introduced into the upper end of the cylinder 330, when the hold-down assembly is in the upper position, as seen in FIGURE 6, the hold-down assembly will be moved to the down position, shown in FIGURE 8 through the connection between the piston rod 332 and the hold-down assembly by the arms 338, 340. Thereafter, the introduction of pressure into the lower end of the cylinder 330, when the hold-down assembly is in the down position, as shown in FIGURE 8, will return the assembly to the up position, shown in FIGURE 6.

When the hold-down assembly moves from the up position shown in FIGURE 6, to the down position, shown in FIGURE 8, a cam member 370 carried by the plate 348 on the hold-down assembly is moved off of the actuator 372 of a hydraulic cam valve 374, for a purpose to be described in connection with the description of FIGURE 10. In like manner, and as seen in the fragmentary view shown in FIGURE 5, when the saw carriage moves forwardly on the rails 152 and 154, another cam member 376 moves off of an actuator 378 of a similar cam valve 380 mounted on a member 381 affixed between the members 34 and 38 for a purpose also to be described in connection with the description of FIGURE 10.

Figure 10:
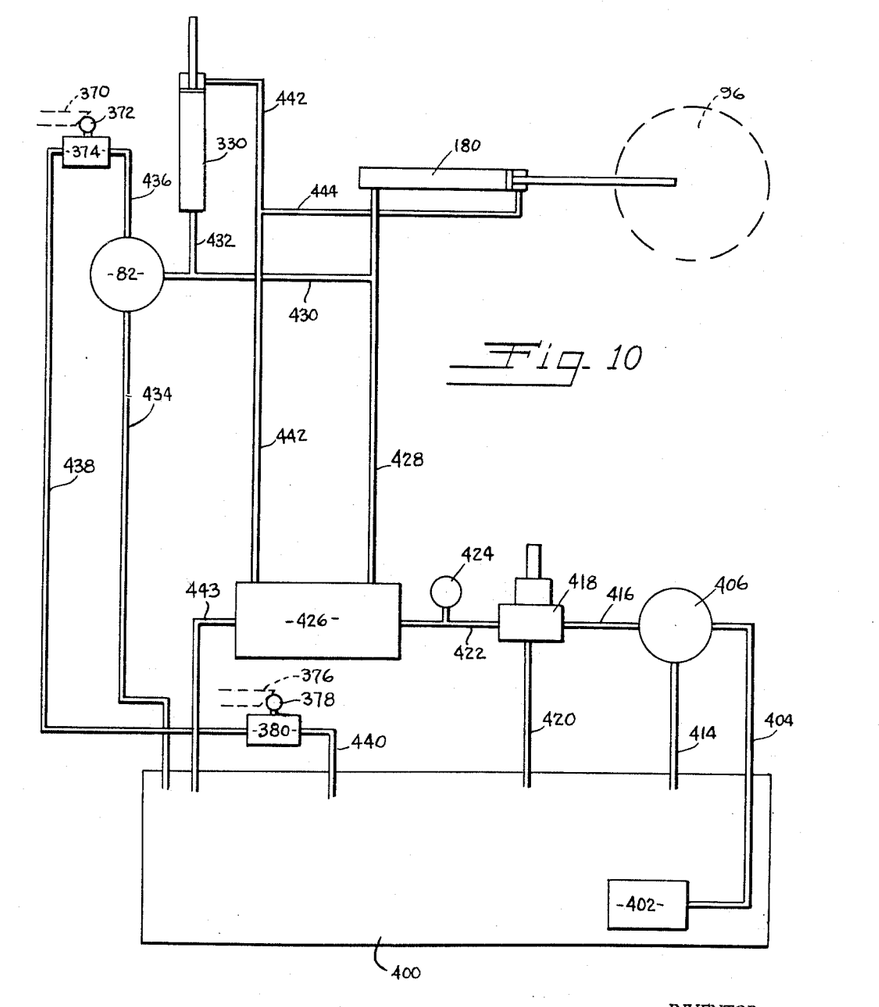
FIGURE 10 is a schematic diagram of the hydraulic operating circuit of the invention.

Referring now to FIGURE 10, the hydraulic control circuit for the apparatus embodying the invention has been schematically illustrated. In FIGURE 10, the hydraulic fluid supply tank 400 is connected through a filter 402 and a line 404 to a pump 406. The pump 406 is constantly rotated by means of an endless belt 408 connecting a pulley 410 on the drive shaft of the pump 406 to a pulley 412 affixed to the shaft 200 for rotation therewith, see FIGURE 2. The pump 406 has a drain line 414 emptying into the supply tank 400. Pump 406 is connected by line 416 to a conventional relief valve 418 having a return line 420 to the tank 400 and through line 422 having a conventional pressure gauge 424 mounted therein to a conventional 4-way solenoid operated master valve 426.

In its normal position, the valve 426 connects the line 422 to the line 428 which enters the rearward or left-hand end of the cylinder 180, as seen in FIGURE 1, to maintain the saw 96 in its rearwardmost position. By means of a T-connection, the line 428 is connected to line 430 which also has a T-connection to connect the line 432 to the lower end of the hold-down mechanism cylinder 330 to maintain the hold-down mechanism in the upward position, as shown in FIGURE 6. Line 430 is also connected to the hydraulic motor 82 and serves to continuously rotate the conveyor belt 86 through the connection of the feed roller sprocket 74 to the sprocket 80 of the motor 82 by the endless chain 78. In the normal position the cam 370 of the hold-down assembly is maintaining the actuator 372 of the cam valve 374 in the down position whereby the cam valve 374 is open. The motor 82 has a drain line 434 to the tank 400 and a feed line 436 to the cam valve 374. Valve 374 is connected by line 438 to the cam valve 380 which is normally maintained in the open position when the saw carriage 151 is in its rearwardmost position by the engagement of the cam 376 with the actuator 378 and the valve 380 is connected by line 440 to the tank 400 to complete the hydraulic circuit through the motor 82 to continuously move the feed conveyor belt 86.

When the 4-way solenoid operated master valve 426 is reversed line 422 is disconnected from the line 428 through the valve 426 and is connected to the line 442 through the valve 426. Simultaneously line 428 is connected by the valve 426 to a return line 443. Line 442 is connected by a T-connection to line 444 which enters the right-hand end of the saw feed cylinder 180, as viewed in FIGURE 1, to move the saw carriage 151 to the left in order to effect a cut. At the same time, the line 442 is connected to the upper end of the hold-down assembly cylinder 330 and moves the hold-down assembly to the down position, as shown in FIGURE 8, to clamp the wood to the wood supporting table 91. The connection of the cylinders 180 and 330 to the return line 443 through valve 426 and line 428 permits the hydraulic fluid in the cylinders to be exhausted through the valve 426 and line 443 to the tank 400.

When the solenoid operated valve 426 is de-energized, the line 442 is connected through the valve 426 to the return line 443 which enters the tank 400, to exhaust the hydraulic fluid from the opposite ends of the cylinders 180 and 300 and the line 442 is again connected through the valve 426 to the line 428 which causes the saw carriage to return to its rearward position and to return the hold-down mechanism to its upper position. When the saw carriage and hold-down mechanisms have been fully returned, the cam valves 374 and 380 are actuated, as previously described, to connect the motor 82 through the now opened lines 436 and 438 and 440 to the tank 400, thus starting the motor 82 again to continue feeding of the conveyor 86.

Figure 11:
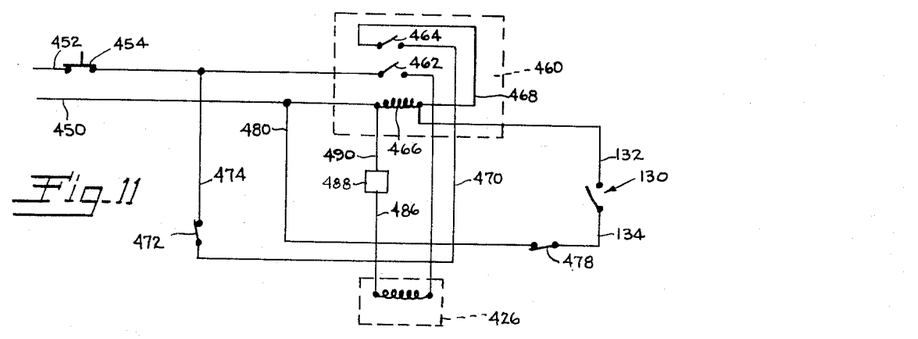
FIGURES 11, 12 and 13 are circuit diagrams of the electrical control circuit of the invention, shown in different states of energization, wherein the heavy lines indicate the portions of the circuit then conducting current.
Figure 12:
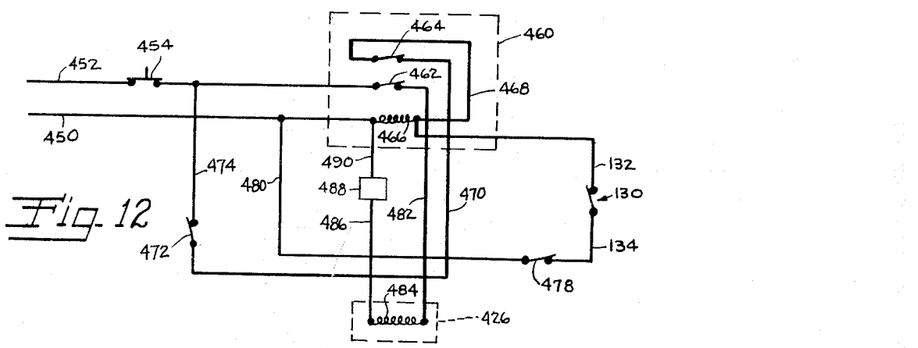
Figure 13:
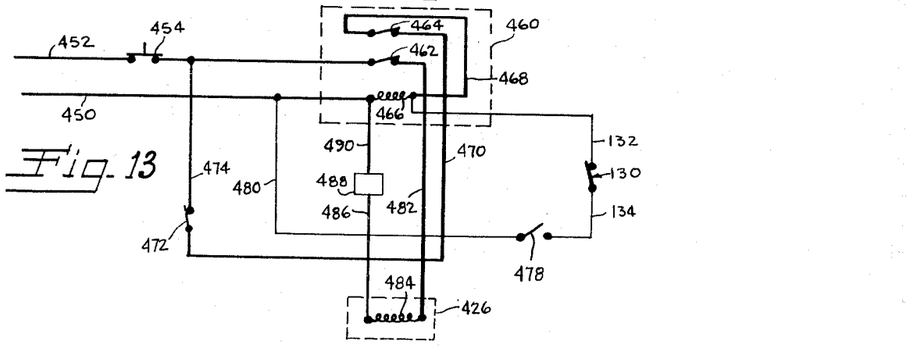

Referring to FIGURES 11, 12 and 13, the electrical circuit for energizing and de-energizing the solenoid of the valve 426 will now be described. In FIGURE 11, the electrical circuit is shown in the normal condition and comprises a hot feed line 450 and a common or return feed line 452, both lines being connected to a 115-volt, direct current power supply. A master manual starting switch 454 is connected in the line 452 and serves to render the circuit operative when in the closed position, as shown in FIGURE 11.

The dash lines at 460 indicate a relay having two pairs of contacts 462 and 464 which are normally open, as shown in FIGURE 11. The relay 460 includes a coil 466, which, when energized, serves to close the contact pairs 462 and 464. The relay coil 466 is connected to the hot side of the power supply by line 450 and the opposite side of the coil 466 is connected by line 468 to one side of the contacts 464. The opposite side of the contacts 464 is connected by line 470 to a normally closed switch 472 which is positioned, as best seen in FIGURE 1, to be opened by a cam 473 mounted on the upper surface of member 188 at the forwardmost point of travel of the saw carriage. The opposite side of the switch 472 is connected by line 474 to the common side of the power supply line 452.

The coil 466 of relay 460 is also connected by line 132 to the stop gate limit switch 130. The opposite side of the switch 130 is connected by line 134 to a normally closed limit switch 478.

As seen in FIGURE 5, the switch 478 is mounted on the box angle member 163 and has its actuator positioned in the path of travel of a cam 479 mounted on the upper surface of the member 188. At the rearwardmost point of travel of the saw carriage, the cam is positioned so as to close the switch 478 whereby forward movement of the saw carriage opens the switch 478.

The switch 130 is normally open and upon engagement of the wood with the stop gate 122, the movement of the gate 122, as described in connection with FIGURE 4, closes the switch 130 thereby completing a circuit through the coil 466 of relay 460 through the line 450, coil 466, line 132, switch 130, line 134, switch 478 and line 480 to the common side of the power supply 452. This condition of the circuit is by the heavy lines shown in FIGURE 12.

In FIGURE 12, the circuit through the coil 466 of relay 460 has closed contact pairs 462 and 464. Closing of the contacts 462 connects a circuit from line 452, contacts 462, line 482, to one side of the solenoid 484 of the solenoid operated valve 426. The opposite side of the solenoid 484 is connected by line 486 through a centrifugally operated switch 488 and line 490 to the hot side of the power supply line 450, thereby energizing the solenoid 484 to actuate the valve 426 to connect the hydraulic line 422 to the hydraulic line 442, and to connect hydraulic line 428 to hydraulic line 433, as described in connection with FIGURE 10.

Energization of the coil 466 of the relay 460 at the same time completes a memory or stick circuit through line 450, coil 466, line 468, memory or stick contacts 464, line 470, switch 472 and line 474 to the common side of the power supply line 452.

Energization of the solenoid operated valve 426, as described in connection with FIGURE 10, causes the saw carriage 151 to move forwardly. This movement, as previously set forth, opens the normally closed switch 478 and the condition of the circuit in this position is shown in FIGURE 13. When the switch 478 opens, the coil 466 of the relay 460 remains energized through the circuit including the memory or stick contacts 464, just described, and the solenoid 484 of the valve 426 remains energized through the circuit including contacts 462 whereby to effect the cutting of the wood. When the saw carriage reaches its forwardmost point of travel, the switch 472 will be opened by the cam 473 to break the circuit through the memory or stick contacts 464, thus de-energizing the coil 466 of the relay 460. This causes the contacts 462 to open to de-energize the solenoid 484 to return the valve 426 to its normal position wherein hydraulic line 422 is connected to hydraulic line 428 and hydraulic line 442 is connected to hydraulic line 443, as is described in connection with FIGURE 10, and to return the saw carriage to its rearwardmost position and the hold-down mechanism to its upward position.

Consequently opening of the switch 472 will de-energize the circuit, shown in FIGURE 13, and return the circuit to the condition, shown in FIGURE 11.

In case the saw 93 is, during the cutting movement, slowed down for any reason, the saw carriage will reverse its direction to back the saw 93 out of engagement with the wood until the saw speed has returned to its normal speed. The mechanism for reversing the saw carriage feed upon slow-down of the saw speed, includes the centrifugally operated switch 488 which is connected between the solenoid valve 426 and the hot side 450 of the power supply lines 486 and 490. The switch 488 is of any suitable commercially available type which operates to open a pair of contacts when the shaft to which the switch is connected falls below a predetermined speed and to close the contacts when the shaft gains its normal speed. Referring to FIGURES 1, 2 and 3, the switch 488 is provided with a shaft 492 to which a pulley 494 is suitably affixed. The pulley 494 is connected by an endless belt 496 to a pulley 498 which is in turn affixed to the main cross shaft 200.

As will be obvious, whenever the speed of the saw 93 decreases below a pre-selected level, due to blade drag, or for any other reason, the rotating speed of the shaft 200 through the belt and pulley connections, previously described, will in turn be decreased. This decrease in speed of the shaft 200 will be transmitted to the shaft 492 of the centrifugal switch 488 through pulley 498, belt 496 and pulley 494. The decrease in speed of the shaft 492 serves to open the contacts of switch 488 thus breaking the circuit through the solenoid 484 of the valve 426, described in connection with FIGURES 12 and 13. This break in the circuit de-energizes the solenoid valve 426 to return the valve to its original position, in which position the hydraulic fluid is fed into the left-hand end of the main cylinder 180, as viewed in FIGURE 1, to move the saw 93 rearwardly or to the right, as viewed in FIGURE 1. When the saw 93 has been moved out of contact with the wood and has regained sufficient speed the contacts of switch 488 will close to reconnect the circuit through the solenoid valve 426, thereby returning the feed of the hydraulic fluid to the right-hand end of the cylinder 180, as viewed in FIGURE 1, to recommence the cutting or forward movement of the saw 93. This action will be continued as often as necessary until the saw 93 has completed its cut, and the speed at which the contacts in the switch 488 open may be varied and pre-selected by the operator of the machine. As will be obvious, this is a completely automatic feature and serves to reciprorate the saw 93 forwardly and rearwardly until the cut is complete, thus eliminating saw stalling and consequent damage to the main drive motor 52 and the connections between he motor 52 and the saw 93.

As will be obvious by my new and improved saw, I have provided for automatic continuous intermittent feeding of the wood to be cut forwardly past the saw table; automatically stopping the wood feed, cutting the wood and returning the saw to the non-cutting position and restoring the feeding of the wood. In addition, I have provided for means to automatically hold the wood down during the cutting operation and to removably support the wood during the cutting operation. Further, I have prvoided for means for adjusting the length of the pieces cut by the saw, and means for eliminating saw stalling or jamming due to blade drag or any other reason.

What I claim is:

A wood saw comprising a frame an alternately moving and stopped wood supporting feed conveyor for feeding wood toward said frame, a wood stop positioned in the path of movement of said wood, a continuously rotating wood saw mounted for cutting and return movements in said frame, an auxiliary support arm mounted intermediate the path of movement of said saw and said stop for supporting the forward end of said wood, control means operable upon engagement of said wood with said stop to halt the movement of said feed conveyor and initiate forward movement of said saw, said forward movement serving to cut the wood positioned in the path of movement of said saw, said control means including means operable in response to a decrease in the speed of rotation of said saw to reverse the feed of said saw and to re-establish the cutting feed when said saw regains its normal rotative speed and further means for reversing the forward movement of said saw upon completion of the cut of the wood, and reverse movement of said saw serving to move said support arm out of supporting position and start movement of said feed conveyor upon completion of said reverse movement, and means operable upon completion of said reverse movement to return said support arm to its supporting position.

References Cited in the file of this patent

UNITED STATES PATENTS

| | | |
|---|---|---|
| 13,351 | Field | July 31, 1855 |
| 407,523 | Greg | July 23, 1889 |
| 614,263 | Ewart | Nov. 15, 1898 |
| 825,518 | Cox | July 10, 1906 |
| 1,574,370 | Curtiss | Feb. 23, 1926 |
| 1,745,873 | Stoltz | Feb. 4, 1930 |
| 1,815,989 | Ruess | July 28, 1931 |
| 1,856,169 | Rosener et al. | May 3, 1932 |
| 2,301,028 | Esch | Nov. 3, 1942 |
| 2,504,004 | McFall | Jan. 30, 1951 |
| 2,614,589 | Coats et al. | Oct. 21, 1952 |
| 2,889,858 | Roberts | June 9, 1959 |

FOREIGN PATENTS

| | | |
|---|---|---|
| 104,894 | Austria | Dec. 10, 1926 |